(12) United States Patent
Minamikawa

(10) Patent No.: US 11,305,514 B2
(45) Date of Patent: Apr. 19, 2022

(54) LAMINATE, VERIFICATION, AND METHOD OF PRODUCING LAMINATE

(71) Applicant: TOPPAN PRINTING CO., LTD., Tokyo (JP)

(72) Inventor: Naoki Minamikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/922,122

(22) Filed: Jul. 7, 2020

(65) Prior Publication Data

US 2020/0331235 A1    Oct. 22, 2020

Related U.S. Application Data

(63) Continuation of application No. PCT/JP2019/000398, filed on Jan. 9, 2019.

(30) Foreign Application Priority Data

Jan. 9, 2018  (JP) .............................. JP2018-001297

(51) Int. Cl.
  *B32B 15/09*   (2006.01)
  *B32B 27/36*   (2006.01)
  (Continued)

(52) U.S. Cl.
  CPC .............. *B32B 15/09* (2013.01); *B32B 27/36* (2013.01); *B32B 27/365* (2013.01);
  (Continued)

(58) Field of Classification Search
  CPC ....... B32B 15/09; B32B 27/36; B32B 27/365; B32B 2307/414; B32B 2425/00; B32B 2429/00; B42D 25/324
  (Continued)

(56) References Cited

U.S. PATENT DOCUMENTS

2015/0298484 A1   10/2015   Motoi et al.
2018/0201046 A1*  7/2018   Yamada .................... B32B 5/18

FOREIGN PATENT DOCUMENTS

JP     2005-284293 A    10/2005
JP        6458791 B2     1/2019
(Continued)

OTHER PUBLICATIONS

International Searching Authority, "International Search Report," issued in connection with International Patent Application No. PCT/JP2019/000398, dated Apr. 2, 2019.
(Continued)

*Primary Examiner* — Justin V Lewis
(74) *Attorney, Agent, or Firm* — Foley & Lardner LLP

(57) ABSTRACT

A laminate includes a recording layer, a translucent front covering layer and a security foil laminated between the recording layer and the front covering layer and sealed in the laminate. The security foil has a thickness that is ⅕ or less the thickness of the recording layer to prevent or reduce falsification reusing the security foil. The security foil includes a relief layer having a relief surface and a protective layer covering the relief surface. In the thickness direction of the laminate, the protective layer adheres to the recording layer and the relief layer adheres to the front covering layer. The adhesion strength between the security foil and the recording layer is higher than the adhesion strength between the security foil and the front covering layer.

6 Claims, 5 Drawing Sheets

(51) Int. Cl.
*B42D 25/324* (2014.01)
*B42D 25/455* (2014.01)
*B42D 25/46* (2014.01)
*G02B 5/18* (2006.01)
*B42D 25/23* (2014.01)
*B42D 25/24* (2014.01)
*B42D 25/391* (2014.01)
*B32B 7/06* (2019.01)
*B42D 25/41* (2014.01)
*B42D 25/328* (2014.01)
*B42D 25/378* (2014.01)

(52) U.S. Cl.
CPC ......... *B42D 25/324* (2014.10); *B42D 25/328* (2014.10); *B42D 25/455* (2014.10); *B42D 25/46* (2014.10); *G02B 5/1861* (2013.01); *B32B 2307/414* (2013.01); *B32B 2425/00* (2013.01); *B32B 2429/00* (2013.01); *B42D 25/23* (2014.10); *B42D 25/24* (2014.10); *B42D 25/378* (2014.10)

(58) Field of Classification Search
USPC .......................... 283/67, 70, 72, 94, 98, 901
See application file for complete search history.

(56) References Cited

FOREIGN PATENT DOCUMENTS

| WO | WO-2017/057722 A1 | | 4/2017 | | |
|----|----|----|----|----|----|
| WO | WO-2017/057723 A1 | | 4/2017 | | |
| WO | WO-2017057722 A1 | * | 4/2017 | ......... | B42D 25/328 |
| WO | WO-2017/131089 A1 | | 8/2017 | | |

OTHER PUBLICATIONS

International Searching Authority, "Written Opinion," issued in connection with International Patent Application No. PCT/JP2019/000398, dated Apr. 2, 2019.

\* cited by examiner

LAMINATE, VERIFICATION, AND METHOD OF PRODUCING LAMINATE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/000398, filed on Jan. 9, 2019, which is based upon and claims the benefit of priority to Japanese Patent Application No. 2018-001297, filed on Jan. 9, 2018, the disclosures of which are all incorporated herein by reference in their entireties.

BACKGROUND

Technical Field

The embodiments of the present disclosure relate to a laminate, a verification device or verification including the laminate, and a method of producing the laminate.

It is known that verification devices, such as ID cards, passports or driver's licenses, which record information for authentication may have a structure in which a security foil including a relief structure is sandwiched between two layers and located inside the outer edges of these layers. In such a verification, the security foil is less likely to suffer from chemical and/or physical damage than in a structure where the security foil is located on the outer surface of the verification, and is less likely to separate from other components forming the verification (e.g., see PTL 1).

PRIOR ART

[Patent Literature] PTL 1: JP 6107137 B

SUMMARY OF THE INVENTION

Technical Problem

In many cases, security foils displaying the same image are used between verifications of the same type. In such verifications, when the security foil is extracted from the genuine verification, the extracted security foil can be reused for producing a fake verification including falsified information for authentication. If authenticity of a fake verification is determined based on the reused security foil, it may be difficult to discriminate a fake verification from the genuine verification because the security foil originates from the genuine verification. Therefore, verifications, which make reuse of the security foil difficult, are sought.

Such issues are not limited to verifications that record information for authentication, but are common to laminates that include a security foil and record information other than the information for authentication.

The present disclosure aims to provide a laminate, or a verification, which can reduce or prevent reuse of a security foil included in the laminate, and a method of producing the laminate.

Solution to Problem

A laminate for solving the above issues includes a recording layer, a translucent front covering layer, and a security foil having a thickness of ⅕ or less of a thickness of the recording layer laminated between the recording layer and the front covering layer, for sealing in the laminate. The security foil includes a relief layer having a relief surface and a protective layer covering the relief surface. The protective layer adheres to the recording layer and the relief layer adheres to the front covering layer in a thickness direction of the laminate. An adhesion strength between the security foil and the recording layer is higher than an adhesion strength between the security foil and the front covering layer.

A verification for solving the above issues includes the laminate described above and a support layer that supports the laminate.

A method of producing a laminate, for solving the above issues includes preparing a recording layer and a front covering layer; sealing a security foil between the recording layer and the front covering layer so as to be located inside outer edges of the recording layer and the front covering layer, the security foil having a thickness of ⅕ or less of a thickness of the recording layer, the security foil including a relief layer having a relief surface and a protective layer covering the relief surface; and applying heat and pressure to the recording layer, the front covering layer and the security foil in a state where the security foil is disposed between the recording layer and the front covering layer to form a laminate sealing the security foil with the recording layer and the front covering layer. An adhesion strength between the security foil and the recording layer is higher than an adhesion strength between the security foil and the front covering layer.

According to the above configuration, the recording layer and the front covering layer are firstly separated from each other when taking out the security foil from the laminate. In this case, since the adhesion strength between the security foil and the recording layer is higher than the adhesion strength between the security foil and the front covering layer, the security foil remains on the recording layer. To reuse the security foil, the security foil has to be separated from the recording layer. When the security foil has a thickness that is ⅕ or less the thickness of the recording layer, the security foil is easily broken when separated, compared to a structure where the security foil has a thickness greater than ⅕ the thickness of the recording layer, e.g., a structure where the thickness of the security foil and the thickness of the recording layer are approximately the same. Thus, the security foil cannot be separated from the recording layer without being broken. Therefore, it is difficult to produce a fake laminate by reusing the security foil of the laminate.

In the laminate described above, the recording layer may include an irradiated portion in a region covered by the security foil as viewed in the thickness direction of the laminate. According to the above configuration, the irradiated portion can be observed with an optical effect exerted by the security foil.

In the laminate described above, the recording layer may comprise polycarbonate, and the protective layer may comprise a resin having a carbonate bond, a urethane bond or an ester bond. According to the above configuration, the adhesion strength between the recording layer and the protective layer can be easily enhanced.

In the laminate described above, the recording layer and the front covering layer may comprise polycarbonate, the protective layer may comprise a first resin having a melting point lower than the melting point of the polycarbonate, and the relief layer may comprise a second resin having a melting point higher than the melting point of the polycarbonate. According to the above configuration, the adhesion strength between the protective layer and the recording layer can be enhanced, and the adhesion strength between the relief layer and the front covering layer can be reduced.

In the laminate described above, the relief layer may comprise at least one material from a first material group consisting of polymethylmethacrylate, cyclic polyolefin and melamine; the protective layer may comprise at least one material from a second material group consisting of polyurethane, polymethyl acrylate, polyester, acid-modified polyolefin and ethylene-vinyl acetate copolymer resin; and the recording layer and the front covering layer may each comprise at least one material from a third material group consisting of polycarbonate, amorphous copolyester and polyvinyl chloride.

According to the above configuration, the adhesion strength of the materials of the first material group for the materials of the third material group is relatively high, while the adhesion strength of the materials of the second material group for the materials of the third material group is relatively low. Therefore, the relief layer comprising at least one material from the first material group and the protective layer comprising at least one material from the second material group can easily achieve a structure in which the adhesion strength between the security foil and the recording layer is higher than the adhesion strength between the security foil and the front covering layer.

In the laminate described above, the relief surface has at least one of properties of diffracting light that is incident on the relief surface, preventing or reducing reflection of light that is incident on the relief surface, isotropically reflecting light that is incident on the relief surface, anisotropically reflecting light that is incident on the relief surface, collecting light that is incident on the relief surface, and reflecting specific polarized light included in light that is incident on the relief surface.

According to the above configuration, since the relief structure has specific optical properties for incident light, counterfeiting the security foil is difficult. Thus, counterfeiting the laminate including the security foil is also difficult, resultantly preventing counterfeiting of the laminate.

In the laminate described above, the front covering layer may transmit part or all of the wavelength range of infrared light; and the security foil may transmit part or all of the wavelength range of infrared light. According to the above configuration, an irradiated portion can be formed on the recording layer via the front covering layer and the security foil. Specifically, an irradiated portion can be formed in a region covered with the security foil as viewed in the thickness direction of the recording layer.

Advantageous Effects of the Invention

According to the present disclosure, reuse of the security foil of the laminate can be prevented or reduced.

DETAILED DESCRIPTION

Figure 1:
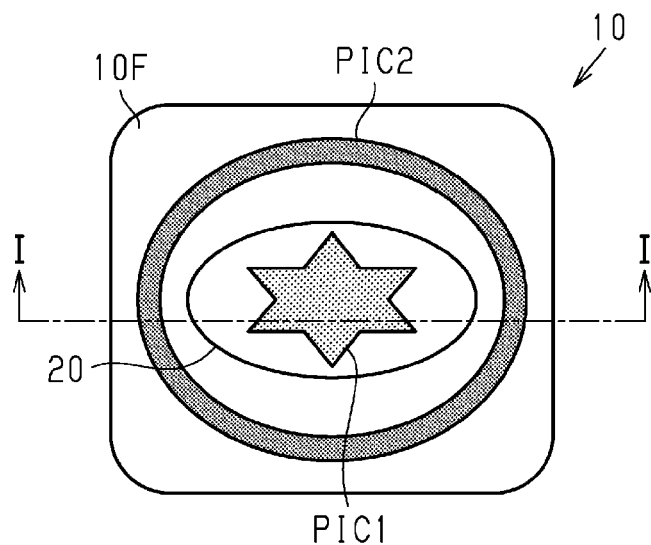
FIG. 1 is a plan view illustrating the structure of a laminate according to an embodiment.

Referring to FIGS. 1 to 9, a laminate, a verification, and a method of manufacturing the laminate will be described. The following description sequentially explains the structure of a laminate, the functions of the laminate, the structure of a verification, the materials used for the layers of the verification, a method of producing the laminate, and results of experiments.

The present embodiments explain the gist of the invention and should not limit the interpretation of the following embodiments. It should be understood that the embodiments are merely representative of the present invention. Those skilled in the art can appropriately change the design of the representative embodiments described below.

The drawings are provided for illustrative purposes only, and the dimensions, e.g., the thickness of the layers and the thickness ratios thereof, are not necessarily to scale. Furthermore, the dimensional ratios should not be construed as being limited to those shown in the drawings. Unless otherwise specified for convenience reasons, like components in the embodiments are denoted by like reference signs to omit duplicate description. The embodiments of the present disclosure are a group of embodiments based on a single unique invention from the background. The aspects of the present disclosure are those of the group of embodiments based on a single invention. The configurations described in the present disclosure can include the aspects of the present disclosure. The features of the present disclosure may be combined with each other to achieve the configurations. Therefore, the features, configurations, aspects and embodiments of the present disclosure may be combined with each other, and the combinations can have synergistic functions and exert synergistic effects.

[Structure of Laminate]

Figure 2:
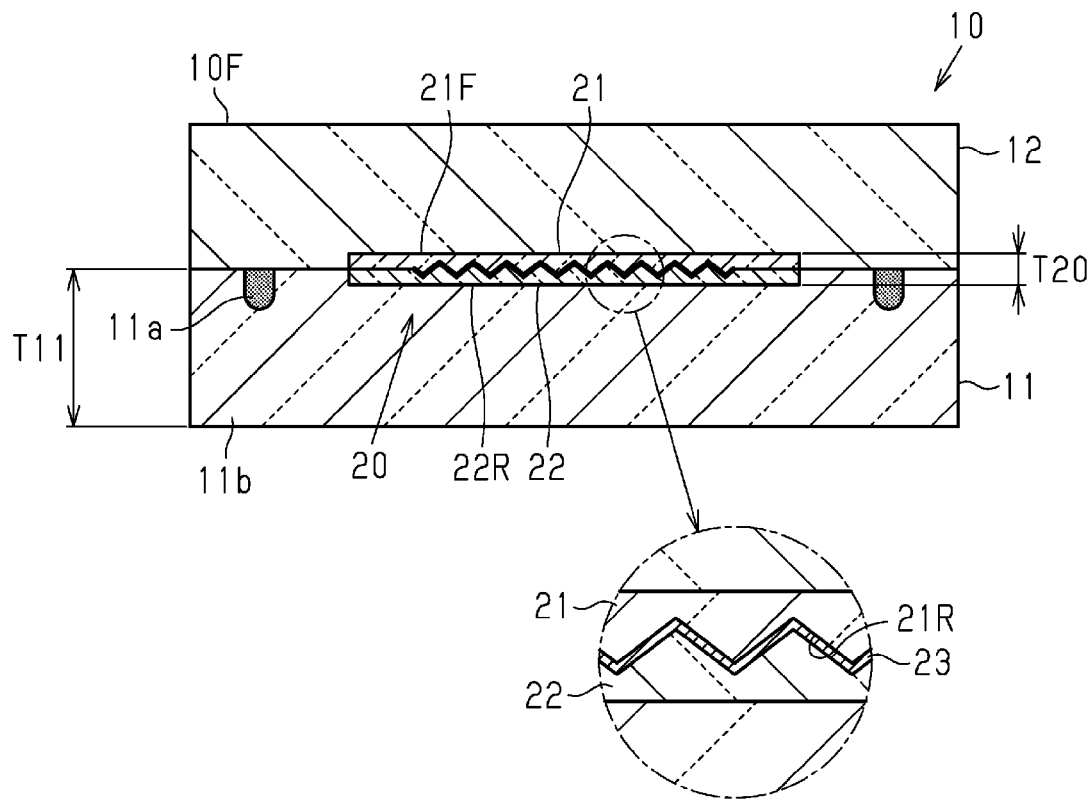
FIG. 2 is cross-sectional view illustrating the structure of the laminate taken along the line I-I of FIG. 1.

Referring to FIGS. 1 and 2, the structure of a laminate will be described.

As shown in FIG. 1, a laminate 10 has a sheet shape. In the configuration shown in FIG. 1, the laminate 10 has a rectangular outline with rounded corners, but the laminate 10 may have a circular or elliptical outline, or other outlines besides a rectangular outline. When the laminate 10 has a rectangular sheet shape with rounded corners, the laminate 10 has a card shape.

The laminate 10 includes a security foil 20, which is located inside the outer edge of the laminate 10 in plan view perpendicular to a surface 10F thereof. Authentication information is recorded on the security foil 20. The security foil 20 may have an elliptical outline, or may have a rectangular or circular outline instead of an elliptical outline. The security foil 20 has a relief surface which can reflect light incident thereon. Authentication information can be recorded on the relief surface. Light reflected by the relief surface presents a first image PIC1 as authentication information. The first image PIC1 is displayed by the light reflected by the relief surface. The security foil 20 displays the first image PIC1 as authentication information. In FIG. 1, the first image PIC1 has a star shape. The type of the first image PIC1 displayed by the security foil 20 may be a geometric pattern, letter, numeral, character (glyph), mark (signature), symbol, emblem, coat of arms, code, or combinations thereof. The symbol or emblem may include a flag, shield, sword, spear, crown, star, moon, heart, logo, ribbon, line, flower, leaf, cereal, fruit, bird, wing, fish, arthropod, mammals, legenadry creature, reptiles or amphibians. The code may be a one-dimensional code or two-dimensional code. The one-dimensional code may be a barcode, serial number or a combination thereof. The two-dimensional code may be a QR code (registered trademark). The geometric pattern may be a guilloche pattern.

The security foil 20 may transmit part or all of the wavelength range of infrared light. The range of transmitted infrared light may include the wavelength of an infrared laser. In particular, the range of transmitted infrared light may include a wavelength in the range of 900 nm or more and 1,100 nm or less. Thus, a YAG laser beam may be transmitted. In this case, a recording layer described later may be irradiated with an infrared laser beam through the security foil 20 to form an irradiated portion on the recording layer. The recording layer is equivalent to the color development layer described in the priority application of the present application.

The laminate 10 may further display a second image PIC2 through the surface 10F. The second image PIC2 may be recorded as an irradiated portion formed on the recording layer described later. The types of the second image PIC2 may be the same as those of the first image PIC1. The second image PIC2 may have shapes that are the same as those of the first image PIC1. The second image PIC2 may surround the security foil 20. The second image PIC2 may have a shape combined with the first image PIC1. The second image PIC2 may be a collection of a plurality of segments. In FIG. 1, the second image PIC2 has an elliptical shape surrounding the first image PIC1.

FIG. 2 shows a cross-sectional structure of the laminate 10 taken along the line I-I of FIG. 1. In FIG. 2, the thickness of each layer of the security foil 20 is exaggerated for convenience of explaining the structure of the security foil 20.

As shown in FIG. 2, the laminate 10 includes a recording layer 11, a translucent front covering layer 12 and the security foil 20. The security foil 20 is laminated and sealed between the recording layer 11 and the front covering layer 12 so as not to be exposed to the outside of the laminate 10. The security foil 20 includes a relief layer 21 having a relief surface 21R. The security foil 20 has a thickness T20 that is ⅕ or less the thickness T11 of the recording layer 11. The thickness T20 of the security foil 20 may be 1/200 or more the thickness T11 of the recording layer 11. In the laminate 10, the adhesion strength between the security foil 20 and the recording layer 11 is higher than the adhesion strength between the security foil 20 and the front covering layer 12. The adhesion strength may be measured by the 90-degree peeling test method according to JIS K 6854-1 (ISO 8510-1).

The relief surface 21R may have at least one of the following properties.

(a) Diffracting light incident on the relief surface 21R (b) Preventing or reducing reflection of the light incident on the relief surface 21R (c) Isotropically reflecting the light incident on the relief surface 21R (d) Anisotropically reflecting the light incident on the relief surface 21R (e) Collecting the light incident on the relief surface 21R (f) Reflecting specific polarized light included in the light incident on the relief surface 21R The relief structure having any of the properties mentioned above has asperities. In other words, the relief surface 21R is a surface having asperities. One relief surface 21R, when including at least one of relief structures having properties different from each other mentioned above, may have at least one of the properties mentioned above. When a plane parallel to a front surface 21F of the relief layer 21 is taken to be a reference plane, the difference between the maximum and minimum heights of the relief structure may be in the range of 0.1 μm or more and 10 μm or less. In the relief structure, the interval between the concavities or convexities may be in the range of 0.1 μm or more and 20 μm or less. The relief layer 21 may transmit part or all of the wavelength range of infrared light. The range of transmitted infrared light may include the wavelength of an infrared laser. In particular, the range of transmitted infrared light may include a wavelength in the range of 900 nm or more and 1,100 nm or less. Thus, a YAG laser beam may be transmitted. In this case, the recording layer 11 may be irradiated with an infrared laser beam through the security foil 20 to form an irradiated portion 11a on the recording layer 11. The laser beam applied to the recording layer 11 for formation of the irradiated portion 11a may be a pulsed laser. Pulsed lasers can modulate the pulse interval or the energy of one pulse. Thus, such a pulsed laser beam can form an irradiated portion 11a on the recording layer 11, according to the material of the recording layer 11. The laser can be an infrared laser having an infrared wavelength. The infrared pulsed laser can be a YAG laser.

The security foil 20 further includes a protective layer 22 covering the relief surface 21R. The security foil 20 has surfaces opposite to each other in the thickness direction thereof. The relief layer 21 has the relief surface 21R, and the front surface 21F that is the surface away from the relief surface 21R. The protective layer 22 has a rear surface 22R that is the surface facing away from the surface contacting the relief surface 21R. The surfaces opposite to each other include a first surface and a second surface. The rear surface 22R of the protective layer 22 may be the first surface contacting the recording layer 11. The front surface 21F of the relief layer 21 may be the second surface contacting the front covering layer 12. The protective layer 22 may transmit part or all of the wavelength range of infrared light. The range of transmitted infrared light may include the wavelength of an infrared laser. In particular, the range of transmitted infrared light may include a wavelength in the range of 900 nm or more and 1,100 nm or less. Thus, a YAG laser beam may be transmitted. In this case, the recording layer 11 may be irradiated with an infrared laser beam through the security foil 20 to form an irradiated portion 11a on the recording layer 11.

The relief layer 21 may comprise at least one material from a first material group consisting of polymethylmethacrylate, cyclic polyolefin and melamine. The material of the protective layer 22 may comprise at least one material from a second material group consisting of polyurethane, polymethyl acrylate, polyester, acid-modified polyolefin and ethylene-vinyl acetate copolymer resin.

The security foil 20 may further include a reflective layer 23. The reflective layer 23 covers the relief surface 21R. The reflective layer 23 may be opaque or translucent. An opaque reflective layer 23 may be a metallic reflective layer. A translucent reflective layer 23 may be a dielectric reflective layer. The dielectric material of the reflective layer 23 may have a refractive index of 2.0 or more in visible light. When the refractive index is 2.0 or more, the reflective layer 23 can easily obtain a difference in refractive index from the relief layer 21. As a result of the reflective layer 23 having the relief structure of the relief surface 21R, the security foil 20 can improve reflectance in at least one of the properties (a), (c), (d), (e), and (f) set forth above. Therefore, the reflected light from the relief surface 21R can be easily observed by an observer of the laminate 10. The reflective layer 23 may transmit part or all of the wavelength range of infrared light so that an infrared laser beam is transmitted. The range of transmitted infrared light may include the wavelength of an infrared laser. In particular, the range of transmitted infrared light may include a wavelength in the range of 900 nm or more and 1,100 nm or less. Thus, a YAG laser beam may be transmitted. In this case, the recording layer 11 may be irradiated with an infrared laser beam through the security foil 20 to form an irradiated portion 11a on the recording layer 11.

The relief surface 21R may include a diffraction grating as a relief structure. Thus, the relief surface 21R has the property of diffracting light incident thereon. The security foil 20 produces a first image PIC1 mentioned above with diffracted light reflected on the relief surface 21R.

As mentioned above, the security foil 20 is located inside the outer edges of the recording layer 11 and the front covering layer 12 in plan view perpendicular to the surface 10F. The portions of the recording layer 11 and the front covering layer 12 outside the security foil 20 in a plan view perpendicular to the surface 10F are adhered to each other. In other words, the laminate 10 seals the security foil 20 with the recording layer 11 and the front covering layer 12. The security foil 20 and the recording layer 11 are adhered to each other. The security foil 20 and the front covering layer 12 are adhered to each other. More specifically, the relief layer 21 of the security foil 20 and the front covering layer 12 are adhered to each other. The protective layer 22 of the security foil 20 and the front covering layer 12 are adhered to each other.

All or part of the recording layer 11 is modified by the laser beam irradiation. The portion of the recording layer 11 which has been modified by the laser beam irradiation serves as the irradiated portion 11a. Thus, the laser beam irradiation produces an irradiated portion 11a in the recording layer 11 to thereby record information on the recording layer 11. The recording layer 11 may be configured by the irradiated portion 11a and a non-irradiated portion 11b. The irradiated portion 11a is a region where the recording layer 11 has been modified by the laser beam irradiation. The non-irradiated portion 11b is a region not irradiated with the laser beam. The laminate 10 may record information in the irradiated portion 11a.

The information recorded on the laminate 10 may be identification information. The identification information may be individual information which is different between each laminate. The identification information may be personal authentication information that can be used for authenticating a person. The personal authentication information may include either or both of biometric information and non-biometric information.

The biometric information is a feature unique to the person to be authenticated among biometric features, and may be an image or a pattern, such as a portrait, fingerprint, veins or signature. The biometric information may be identifiable biometric information. The non-biometric information is personal information other than biometric information. The non-biometric personal information includes a name, date of birth, age, blood type, gender, nationality, address, affiliation and signature. The non-biometric information may be formed of a plurality of characters, a plurality of numerals, symbols, diagrams or handwriting. The non-biometric information may be digital data. The digital data may be recorded as a code. The code may be encrypted or may be in plaintext, or both.

Figure 3:
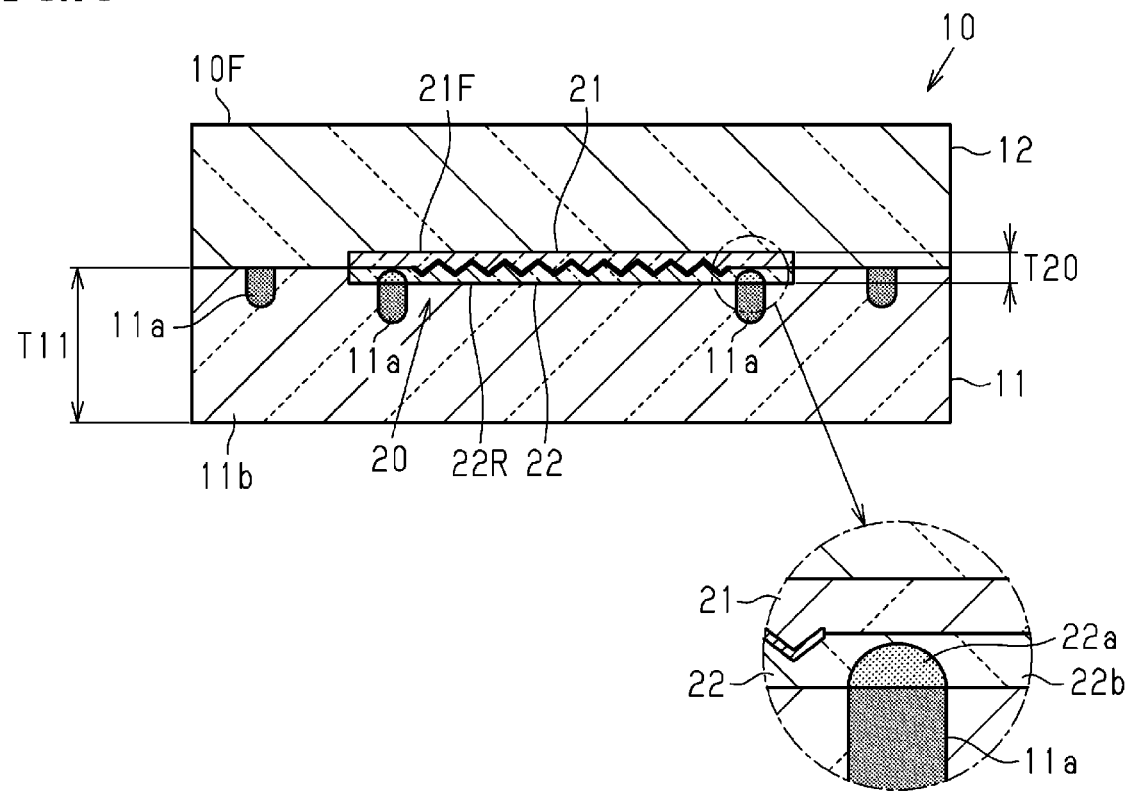
FIG. 3 is cross-sectional view illustrating the structure of another laminate.

As shown in FIG. 3, the irradiated portion 11a may be formed in a region overlapping the security foil 20 as viewed in the thickness direction of the laminate 10. In this case, the irradiated portion 11a overlaps a part of the security foil 20, and the non-irradiated portion 11b overlaps the remaining part of the security foil 20. The identification information or the identifiable biometric information may be recorded in the irradiated portion 11a overlapping the security foil 20. The identifiable biometric information may be personal authentication information including biometric information. The identification information or the identifiable biometric information can be prevented from being falsified by being recorded in the irradiated portion 11a overlapping the security foil 20. The identification information or the identifiable biometric information may be produced by combining a part of the irradiated portion 11a overlapping the security foil 20 with a part thereof not overlapping the security foil 20. In other words, the identification information or the identifiable biometric information may be produced by combining a part of an irradiated portion 11a overlapping the security foil 20 and having records of the information, with a part of the irradiated portion 11a not overlapping the security foil 20 and having records of the information. In this case, the part of the irradiated portion 11a overlapping the security foil 20 and having records of the identification information or the identifiable biometric information is supplemented by the part of the irradiated portion 11a not overlapping the security foil 20 and having records of the information. The adhesion strength between the irradiated portion 11a and the security foil 20 may be lower than the adhesion strength between the non-irradiated portion 11b and the security foil 20.

When the region for forming the irradiated portion 11a is irradiated with a laser beam, a part of the protective layer 22 contacting the region is also irradiated by the laser beam. As a result, a low-adhesion portion 22a is formed in the protective layer 22, which is the portion irradiated with the laser beam. The protective layer 22 is formed of the low-adhesion portion 22a and a high-adhesion portion 22b which is not irradiated with a laser beam. A part of the protective layer 22 residing in the low-adhesion portion 22a is modified by the laser beam irradiation. The high-adhesion portion 22b of the protective layer 22 may comprise a crystalline resin, and the crystalline resin of the protective layer 22 may be in an amorphous state in the low-adhesion portion 22a. While the high-adhesion portion 22b of the protective layer 22 comprises a crystalline resin, the crystalline resin of the protective layer 22 is brought into an amorphous state in the low-adhesion portion 22a due to the laser beam irradiation. Therefore, the adhesion strength of the high-adhesion portion 22b to the recording layer 11 can be made equal to or more than the adhesion strength of the low-adhesion area 22a thereto. In other words, the adhesion strength of the low-adhesion portion 22a to the recording layer 11 is lower than that of the high-adhesion portion 22b. Thus, the protective layer 22 may comprise a crystalline resin. The crystalline resin of the protective layer 22 may be a crystalline polyester.

Furthermore, the adhesion strength between the irradiated portion 11a of the recording layer 11 and the low-adhesion portion 22a of the security foil 20 may be lower than the adhesion strength between the security foil 20 and the front covering layer 12. In this case, when the front covering layer 12 is separated, the portion of the security foil 20 contacting the non-irradiated portion 11b remains on the recording layer 11. Moreover, the irradiated portion 11a remains on the front covering layer 12, that is, is separated together with the front covering layer 12. Therefore, the security foil 20 is broken. Thus, reuse of the security foil 20 can be prevented. The region of the security foil 20 corresponding to the irradiated portion 11a of the recording layer 11 may be modified. In this case, the information of the irradiated portion 11a is also recorded on the security foil 20 to prevent the security foil 20 from being used for another purpose.

The irradiated portion 11a is modified. The modification may be carbonization of the region for the irradiated portion 11a. The modification may be foaming of the region for the irradiated portion 11a. The irradiated portion 11a may be colored due to the modification. The color can be black. The color of the irradiated portion 11a may be a color other than black, or may be white or opalescent. In the recording layer 11, the non-irradiated portion 11b may be translucent so that visible light can be transmitted therethrough. The irradiated portion 11a does not have to transmit visible light, or may transmit only part of visible light. The irradiated portion 11a may be opaque. The transmittance of the non-irradiated portion 11b may be higher than that of the irradiated portion 11a. The second image PIC2 mentioned above is produced by the irradiated portion 11a. The recording layer 11 may have a thickness in the range of 50 μm or more and 800 μm or less.

The front covering layer 12 may be translucent so that visible light can be transmitted therethrough. The front covering layer 12 may also transmit part or all of the wavelength range of infrared light. In the front covering layer 12, the surface facing away from the surface contacting the recording layer 11 is the surface 10F of the laminate 10. The laminate 10 can display images through the surface 10F due to the front covering layer 12 being translucent. Due to the front covering layer 12 transmitting part or all of the wavelength range of infrared light, an irradiated portion 11a can be formed in the recording layer 11 by applying an infrared laser beam thereto through the front covering layer 12. The front covering layer 12 may have a thickness in the range of 50 μm or more and 800 μm or less.

When the front covering layer 12 and the security foil 20 are configured to transmit infrared light, the recording layer 11 can have an irradiated portion 11a in a region thereof covered by the security foil 20, as viewed in the thickness direction of the recording layer 11. Since the security foil 20 covers the irradiated portion 11a, the information recorded in the irradiated portion 11a can be prevented from being falsified. In other words, if the information in the irradiated portion 11a is attempted to be falsified by separating the security foil 20 from the recording layer 11 and newly forming an irradiated portion 11a, the security foil 20 will be broken due to the security foil 20 being strongly adhered to the recording layer 11. This resultantly prevents falsification of the laminate 10 performed by rewriting the irradiated portion 11a and re-adhering the security foil 20.

The recording layer 11 and the front covering layer 12 may each comprise at least one material from a third material group consisting of polycarbonate, amorphous copolyester and polyvinyl chloride. The adhesion strength of the materials belonging to the first material group for the materials belonging to the third material group is relatively high, while the adhesion strength of the materials belonging to the second material group for the materials belonging to the third material group is relatively low. Therefore, the relief layer 21 comprising at least one material from the first material group and the protective layer 22 comprising at least one material from the second material group can easily achieve a structure in which the adhesion strength between the security foil 20 and the recording layer 11 is higher than the adhesion strength between the security foil 20 and the front covering layer 12.

As described above, the security foil 20 has a thickness that is ⅕ or less the thickness of the recording layer 11. Since the security foil 20 is very thin compared to the recording layer 11, the side faces of the security foil 20 contacting the recording layer 11 have an area that is negligibly small relative to the area of the rear surface 22R of the protective layer 22 contacting the recording layer 11. Therefore, the rear surface 22R of the protective layer 22 may be regarded as the only surface of the security foil 20 contacting the recording layer 11. The same applies to the relationship between the front surface 21F of the relief layer 21 and the front covering layer 12.

[Advantageous Effects of Laminate]

Figure 4:
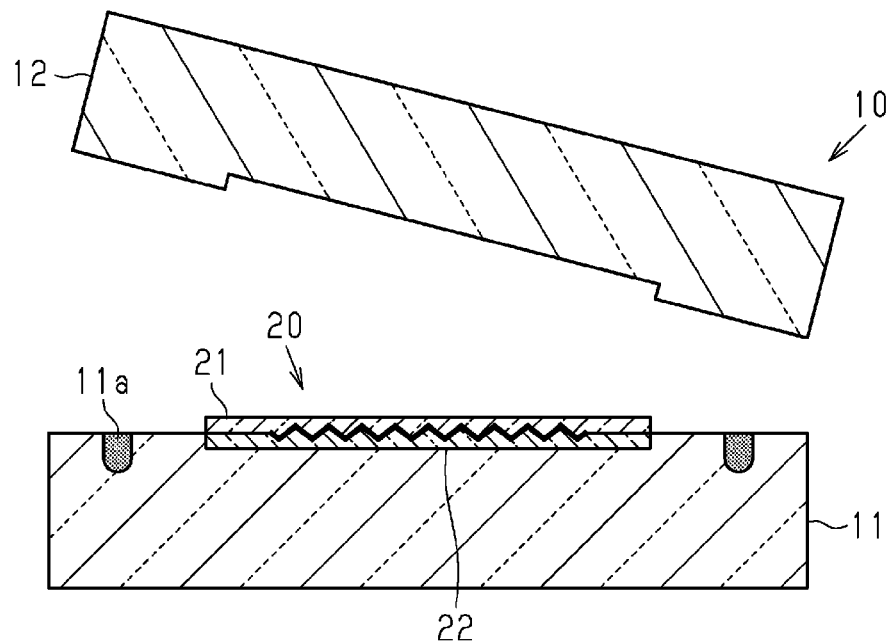
FIG. 4 is a diagram illustrating a state where the laminate of FIG. 1 has been separated.

Referring to FIG. 4, a state where the laminate has been separated will be described.

As shown in FIG. 4, the recording layer 11 and the front covering layer 12 will be firstly separated when the security foil 20 is extracted from the laminate 10. In this case, if the adhesion strength between the security foil 20 and the recording layer 11 is higher than the adhesion strength between the security foil 20 and the front covering layer 12, the security foil 20 will remain on the recording layer 11 side. To reuse the security foil 20, the security foil 20 has to be separated from the recording layer 11. In this regard, the thickness T20 of the security foil 20 is ⅕ or less the thickness T11 of the recording layer 11. Accordingly, it is difficult to separate the security foil 20 from the recording layer 11 without breaking the security foil 20, compared to the configuration where, for example, the thickness T20 of the security foil 20 and the thickness T11 of the recording layer 11 are approximately the same. This may disable reuse the security foil 20 of the laminate 10. Thus, producing a fake laminate using the security foil 20 is difficult. Furthermore, since the thickness T20 of the security foil 20 is ⅕ or less the thickness T11 of the recording layer 11, a laser beam can be easily transmitted through the security foil 20, while the laser beam can be easily absorbed by the recording layer 11. If the thickness T20 of the security foil 20 is 1/200 or more of the thickness T11 of the recording layer 11, the processability may be enhanced. If the thickness of the recording layer 11 is smaller than five times the thickness of the security foil 20, the security foil 20 can be easily extracted by scraping off the recording layer 11.

The recording layer 11 may have a thickness in the range of 50 μm or more and 800 μm or less. In addition, the difference between the maximum and the minimum heights of the relief structure may be in the range of 0.1 μm or more and 10 μm or less, and the interval between the concavities or convexities may be in the range of 0.1 μm or more and 20 μm or less. Since the thickness of the security foil 20 is ⅕ or less the thickness of the recording layer 11, it may be difficult to separate the security foil 20 from the recording layer 11 without breaking the relief surface 21R of the security foil 20. This may increase the probability for the separated security foil 20 to include a relief surface 21R with optical properties that are different from those of the genuine security foil 20. As a result, a fake laminate using a separated security foil 20 can be easily discriminated as being an imitation of the genuine laminate 10.

[Structure of Verification]

Figure 5:
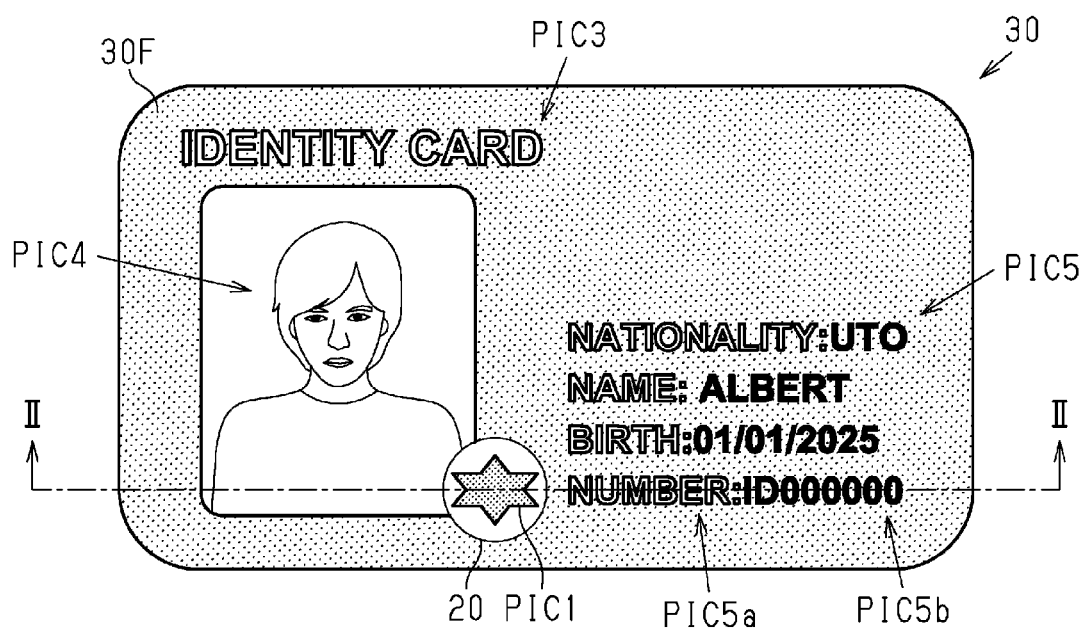
FIG. 5 is a plan view illustrating the structure of a verification according to an embodiment.
Figure 6:
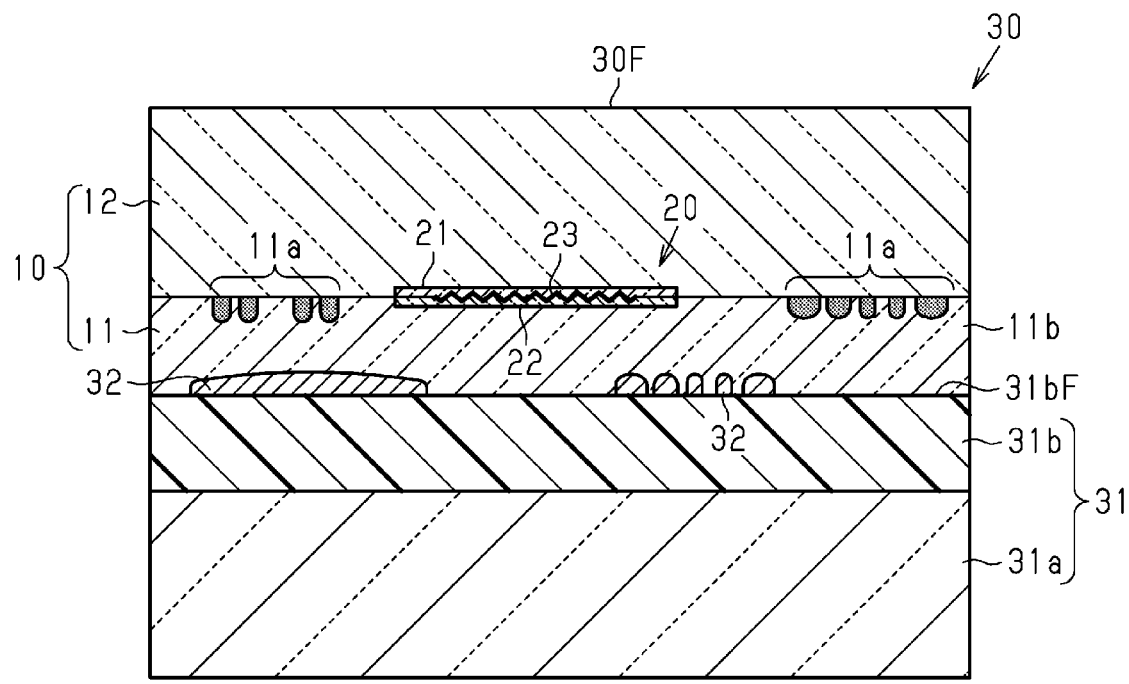
FIG. 6 is a cross-sectional view illustrating the structure of the verification taken along the line II-II of FIG. 5.

Referring to FIGS. 5 and 6, a structure of a verification including the laminate 10 will be described. The following description will be explained taking an example in which the verification is implemented as a personal identification document. In FIG. 6, the thickness of each layer of the verification is exaggerated for convenience of describing the structure of the verification. The verification may be an ID card, a passport, a visa or the like.

As shown in FIG. 5, a verification 30 includes a front surface 30F. The verification 30 has a card shape in plan view perpendicular to the front surface 30F. In FIG. 5, the verification 30 records information using a first image PIC1, a third image PIC3, a fourth image PIC4, and a fifth image PIC5. The verification 30 may display the first, third, fourth and fifth images PIC1, PIC3, PIC4 and PIC5 via the front surface 30F. In other words, the first image PIC1, the third image PIC3, the fourth image PIC4, and the fifth image PIC5 may be visible images.

The third image PIC3 represents text indicating the type of the verification 30. The fourth image PIC4 represents a portrait of the owner of the verification 30. The fourth image PIC4 may be identifiable biometric information. The identifiable biometric information may be personal authentication information that can be used for authenticating a person. The fifth image PIC5 represents a type PIC5a of identification information used for personal identification, and owner identification information PIC5b corresponding to each type PIC5a. The fourth image PIC4 may be recorded using a laser beam. The fourth image PIC4 may be an image of the irradiated portion 11a. The type PIC5a of identification information may be printed or recorded by a laser beam. The type PIC5a of identification information may be printed or may be an image of the irradiated portion 11a. The identification information PIC5b may be recorded by a laser beam. The identification information PIC5b may be an image of the irradiated portion 11a. The identification information PIC5b may be non-biometric information. The verification 30 may record the type of verification, a portrait of the owner or identification information of the owner thereon. The portrait of the owner or the identification information of the owner may be recorded on the verification 30 in the form of an irradiated regions 11a. The verification 30 may include other information used for authentication of the owner of the verification 30.

FIG. 6 shows a cross-sectional structure of the verification 30 taken along the line II-II of FIG. 5.

As shown in FIG. 6, the verification 30 includes a support layer 31 in addition to the laminate 10. The support layer 31 can reinforce the laminate 10. The support layer 31 may have a single-layer structure or may have a multilayer structure. The support layer 31 may be a multilayer structure including a rear covering layer 31a and a white layer 31b. In the verification 30, the rear covering layer 31a, the white layer 31b and the laminate 10 are laminated in this order. In the laminate 10, the recording layer 11 is in contact with the white layer 31b.

The rear covering layer 31a may have the same configuration as the front covering layer 12 of the laminate 10. In other words, the rear covering layer 31a may be translucent. The rear covering layer 31a does not have to be translucent. The support layer 31 may include a colored layer having a color other than white, instead of the white layer 31b. In this case, the color of the colored layer can be different from the color of the irradiated portion 11a of the laminate 10. Thus, the image produced by the irradiated portion 11a can be easily observed due to the contrast with the color of the colored layer.

In the white layer 31b, the surface facing away from the surface contacting the rear covering layer 31a is a surface 31bF. Printed matter 32 may be provided to the surface 31bF of the white layer 31b. The printed matter 32 may be formed by printing an ink. The printed matter 32 may be formed by printing a visible ink or an invisible ink, or both. The visible printed matter may be formed by printing a visible ink. The invisible printed matter may be formed by printing an invisible ink. The printed matter 32 may be provided to a region overlapping the security foil 20 as viewed in the thickness direction of the laminate 10.

The printed matter 32 may be security printing. The irradiated portion 11a may be formed in a region overlapping the security printing as viewed in the thickness direction of the laminate 10. The identification information or the identifiable biometric information may be recorded in the irradiated portion 11a overlapping the printed matter 32. The irradiated portion 11a, on which the identification information or the identifiable biometric information is recorded, may be sandwiched between the security foil 20 and the security printing. The identification information or the identifiable biometric information can be prevented from being falsified by being recorded in the irradiated portion 11a overlapping the security printing. In particular, this can prevent falsification that would be performed by scraping the recording layer 11 from the white layer 31b side and recording other identification information or identifiable biometric information on the scraped recording layer 11.

The security printing may be a guilloche pattern, microtext, invisible printing or optically variable printing. The visible ink may be obtained by dispersing a pigment in a medium or mixing a dye with a medium. A visible ink may be made optically variable by using a pearl ink or a magnetic ink as a pigment. Printing using an optically variable ink may be optically variable printing. The invisible ink may be a fluorescent ink or an infrared absorbing ink. The fluorescent ink may be an ultraviolet-excited fluorescent ink, a visible light-excited ink or an infrared-excited ink. An optically variable ink or an invisible ink may be used for anti-counterfeiting.

The printing may be gravure printing, offset printing or screen printing. As shown in FIG. 6, the printed matter 32 includes a printed portion displaying the third image PIC3, a printed portion displaying a background of the portrait in the fourth image PIC4, and a printed portion displaying the type PIC5a in the fifth image PIC5. The color of the printed matter 32 may be the same as or different from the color of the irradiated portion 11a.

In the laminate 10 of the verification 30, the irradiated portion 11a may be opaque while the non-irradiated portion 11b may be translucent. Thus, the printed matter 32 can be observed by an observer via the front surface 30F of the verification 30 due to the non-irradiated portion 11b and the front covering layer 12 being translucent. In the front covering layer 12, the surface facing away from the surface contacting the recording layer 11 is the front surface 30F of the verification 30.

As shown in FIG. 6, the irradiated portion 11a may include a region displaying a portrait in the fourth image PIC4 and a region displaying the identification information PIC5b in the fifth image PIC5. The portrait in the fourth image PIC4 and the identification information PIC5b in the fifth image PIC5 are images depending on the owner of the verification 30. The owner can be identified by the identification information PIC5b in the fifth image PIC5. By displaying such images using the irradiated portion 11a, a plurality of verifications 30 that record information corresponding to the respective persons can be produced by only changing the laser beam pattern applied to the recording layer 11 before forming the irradiated portion 11a, between the verifications 30.

The information recorded in the irradiated portion 11a or the non-irradiated portion 11b may be identification information. The identification information may be unique information. The identification information may be personal authentication information that can be used for authenticating a person. The personal authentication information may include either or both of biometric information and non-biometric information.

In this way, information that is unique to the owner is recorded on the recording layer 11 of the verification 30. Therefore, to falsify the verification 30, the recording layer has to be replaced with a falsified recording layer and then the security foil 20 has to be bonded to the recording layer, i.e., the security foil 20 has to be reused. However, since it is difficult to separate the security foil 20 from the recording layer 11 as mentioned above, falsification of the verification 30 can be minimized. If the identification information of the verification 30 were falsified, the falsifier could impersonate the person certified by the verification 30.

The front covering layer 12 separated from the security foil 20 does not include authentication information as does the security foil 20. Therefore, if the front covering layer 12 is separated from the security foil 20, there is no concern that the verification 30 will be counterfeited using the front covering layer 12.

[Material of Each Layer of Verification]

Hereinafter, materials used for forming of the layers of the verification 30 will be described.

[Covering Layers 12 and 31a]

The same material can be used for forming the covering layers 12 and 31a. Of the covering layers 12 and 31a, the front covering layer 12 is required to have optical transparency for the wavelength of visible light or observation light so that the first image PIC1 displayed by the security foil 20 can be displayed outside via the front surface 30F of the verification 30. The material for forming the covering layers 12 and 31a may be polycarbonate, amorphous copolyester or polyvinyl chloride.

The covering layers 12 and 31a may each have a thickness in the range of 50 μm or more and 800 μm or less. When the covering layers 12 and 31a each have a thickness of 50 μm or more, the physical strength can be increased. The increase of physical strength is useful for preventing defects, such as wrinkling, in the covering layers 12 and 31a. When the covering layers 12 and 31a each have a thickness of 800 μm or less, thickness variation or bending can be reduced in the covering layers 12 and 31a. Reducing thickness variation or bending in the covering layers 12 and 31a is useful for preventing defects, such as warpage, during lamination.

[Recording Layer 11]

When irradiated with a laser beam having a specific wavelength, the recording layer 11 absorbs the laser beam and the material thereof is modified. The modified material of the recording layer 11 may have a predetermined color. The modification of the material of the recording layer 11 may be carbonization. The material for the recording layer 11 may have a black color by carbonization. The black color may have a reflectance of 20% or less. The reflectance may be the brightness ratio between the incident light and the reflected light. Furthermore, the material for the recording layer 11 may be a mixture that develops a color due to laser beam irradiation. Such a mixture may contain thermoresponsive microcapsules. Due to laser beam irradiation, the recording layer 11 mixed with thermoresponsive microcapsules is modified and develops a color by reaction of the thermoresponsive microcapsules. Therefore, information can be recorded on the recording layer 11 by irradiating the recording layer 11 with a laser beam in a specific pattern.

The material for forming the recording layer 11 may be obtained by adding an energy absorber that absorbs a laser beam having a specific wavelength to a polycarbonate, or may be a material having an energy absorbing molecular structure. In such a material, the heat generated as a result of the energy absorber or the energy absorbing molecular structure absorbing a laser beam chemically changes the polycarbonate, resultantly giving a predetermined color to the recording layer 11. For example, such a material may be LEXAN SD8B94 (manufactured by SABIC) (LEXAN is a registered trademark). Other than the polycarbonate, the material for forming the recording layer 11 may be polyvinyl chloride, amorphous copolyester, or the like.

Among polycarbonate, polyvinyl chloride and amorphous copolyester, a polycarbonate, when used as a material for forming the recording layer 11, can enhance the durability and contrast of the recording layer 11 at the time of color development, compared to case of using other materials.

As mentioned above, the thickness of the recording layer 11 may be in the range of 50 μm or more and 800 μm or less. When the thickness of the recording layer 11 is 50 μm or more, insufficient color development is less likely to occur in the irradiated portion 11a, which would otherwise have occurred due to the insufficient thickness of the recording layer 11. Thus, sufficient contrast is obtained between the irradiated and non-irradiated portions 11a and 11b. When the thickness of the recording layer 11 is 800 μm or less, lowering of optical transparency of the non-irradiated portion 11b and insufficient contrast between the irradiated and non-irradiated portions 11a and 11b can be minimized. When the recording layer 11 or the covering layer 12 has a larger thickness, stress may be easily dispersed when separated and a high adhesion strength may be easily achieved. Therefore, by increasing the thickness of the recording layer 11 even more than that of the covering layer 12, the adhesion strength can be controlled so as to satisfy the conditions of the present disclosure.

[White Layer 31b]

The white layer 31b may be white. Whiteness of the white layer 31b enables easy observation of the printed matter 32 or the irradiated portion 11a, clearly producing color difference between the white layer 31b and the printed matter 32 or between the white layer 31b and the irradiated portion 11a. The total light reflectance of the white layer 31b in visible light may be in the range of 70% or more and 99% or less. The total light reflectance may be a brightness ratio of the incident light to the reflected light. When the reflectance in visible light is in the range of 70% or more and 99% or less, visibility of the printed matter 32 or the irradiated portion 11a can be enhanced.

The white layer 31b may be opaque. Thus, a circuit in the verification 30 can be hidden from an observer of the verification 30. In particular, a circuit in the verification 30 can be completely hidden from an observer of the verification 30 by entirely covering the circuit with the white layer 31b. Such a circuit may include a chip, antenna, resistor, wiring pattern and capacitor. The optical transmission density of the opaque white layer 31b may be 1.0 or more. Alternatively, the optical transmission density of the opaque white layer 31b may be 1.5 or less. The identification information may be recorded on a chip of the circuit in the verification 30. The identification information to be recorded may include identification information recorded by a laser beam on the verification 30. The identification information to be recorded may be encrypted.

The material for forming the white layer 31b may be polyvinyl chloride, amorphous copolyester or polycarbonate comprising a white material, such as titanium oxide. The white layer 31b may have a thickness in the range of 200 μm or more and 800 μm or less. When the thickness of the white layer 31b is 200 μm or more, opacity can be easily obtained. When the thickness of the white layer 31b is 800 μm or less, thickness variation or bending can be reduced in the white layer 31b. Reducing thickness variation or bending in the white layer 31b is useful for preventing defects, such as warpage, during lamination.

[Relief Layer 21]

The material for forming the relief layer 21 may be polyester, polyurethane, polyacrylate, acid-modified polyolefin, ethylene-vinyl acetate copolymer resin materials, polymethylmethacrylate, cyclic polyolefin, melamine, inorganic particles, epoxy resins or cellulose-based resins, or mixtures, composites or copolymers of these materials. The material for forming the relief layer 21 may be a cured resin. A cured resin may be obtained by curing a curable precursor. A cured resin may be obtained by curing a resin with ultraviolet light, heat, or an electron beam. The curable precursor may be thermoplastic.

The curable precursor that can be used for forming the relief layer 21 may also be an ultraviolet curable resin such as a monomer, oligomer or a polymer containing an ethylenically unsaturated bond or an ethylenically unsaturated group. The monomer may be 1,6-hexanediol, neopentyl glycol diacrylate, trimethylolpropane triacrylate, pentaerythritol triacrylate, pentaerythritol tetraacrylate, dipentaerythritol pentaacrylate, dipentaerythritol hexaacrylate or the like. The oligomer may be epoxy acrylate, urethane acrylate, polyester acrylate or the like. The curable precursor for forming the relief layer 21 may be a material other than these.

It should be noted that the material for forming the relief layer 21 may comprise at least one of polymethylmethacrylate, acid-modified polyolefin and melamine. These materials have good formability. The relief layer 21 is not limited to a single layer but may be a multilayer. A multilayer relief layer 21 may be a laminate of a curable resin and a thermoplastic resin. The relief surface 21R side of the relief layer 21 may be a curable resin layer, and the opposite side may be a thermoplastic resin layer. The thermoplastic resin may comprise polymethylmethacrylate or acid-modified polyolefin. Alternatively, a multilayer relief layer 21 may include thermoplastic resin layers having different physical properties. Furthermore, the relief layer 21 may comprise an inorganic powder or a polymer powder. By comprising a powder, the adhesion strength can be controlled between the relief layer 21 and the front covering layer 12. Therefore, the relief surface 21R side of the relief layer 21 may be a curable resin layer, and the opposite side may be a thermoplastic resin layer comprising an inorganic powder or a polymer powder.

[Protective Layer 22]

The material for forming the relief layer 21 may be used as a material for forming the protective layer 22. The material for forming the protective layer 22 may comprise at least one of polymethylmethacrylate, polyester, cyclic polyolefin, melamine and an ethylene-vinyl acetate copolymer resin. These materials easily achieve sufficient adhesion strength between the protective layer 22 and the layer comprising polycarbonate and contacting the protective layer 22. Alternatively, the material that can be used for forming the protective layer 22 may be a resin having a carbonate bond (—O—CO—O—), a urethane bond (—NH—CO—) or an ester bond (—O—CO—). When adhered with polycarbonate, the adhesion strength of the polycarbonate tends to be high with a resin having an ester bond or a urethane bond, which has a structure similar to that of a carbonate bond. Therefore, by allowing the protective layer 22 to comprise a resin having such a bond, the adhesion strength can be easily enhanced between the protective layer 22 and the layer comprising polycarbonate and contacting the protective layer 22. The material for forming the protective layer 22 may comprise a crystalline resin. The crystalline resin may be a crystalline polyester or the like. The material for forming the protective layer 22 may be a thermoplastic resin. The material for forming the protective layer 22 may be a composite of two or more resins having different melting points. The adhesion of a crystalline resin can be modified by laser irradiation. Thus, a trace of separation of the security foil 20 is ensured to be left.

In the laminate 10, the protective layer 22 may comprise a resin having a lower melting point than polycarbonate, and the relief layer 21 may comprise a resin having a higher melting point than polycarbonate.

In particular, when a material, such as polycarbonate, mainly undergoes direct fusion bonding by heat and pressure as a method of adhesion with another material, the adhesion strength between these two materials contacting each other, i.e., the materials forming an interface, is greatly affected by whether the two materials have been fused when adhered to each other. The adhesion between the two materials forming an interface is increased when these materials have both been fused. However, the adhesion between the two materials is reduced if one or both of the materials have not been fused when bonded together. In this regard, since the protective layer 22 comprises a resin having a lower melting point than polycarbonate, and the relief layer 21 comprises a resin having a higher melting point than polycarbonate, the adhesion strength between the protective layer 22 and the layer comprising polycarbonate can be controlled.

[Reflective Layer 23]

The reflective layer 23 may be opaque or translucent. An opaque reflective layer 23 may be a metallic reflective layer. The metal forming the reflective layer 23 may be aluminum or silver. A translucent reflective layer 23 may be a dielectric reflective layer. The dielectric material of the reflective layer 23 may be a metal compound or silicon oxide. The metal compound may be a metal sulfide or a metal oxide. The metal sulfide may be zinc sulfide. The metal oxide may be titanium dioxide. The reflective layer 23 may have a thickness in the range of 10 nm or more and 20 nm or less. The reflective layer 23 may be formed by deposition. Physical deposition (PVD) or chemical deposition (CVD) may be applied to the deposition. Vacuum deposition, sputtering or the like may be applied to the physical deposition. The reflective layer 23 may be a single layer or a multilayer. A multilayer reflective layer 23 may be formed by performing deposition several times.

The reflective layer 23 may be formed across the relief surface 21R, or may be formed only in portions of the relief surface 21R. When the reflective layer 23 is formed only in portions of the relief surface 21R, the reflective layer 23 may include a plurality of regions, and each region may have a shape of a geometric symbol, emblem, coat of arms, or a combination thereof. The symbol or emblem may include a flag, shield, sword, spear, crown, star, moon, heart, logo, ribbon, line, flower, leaf, cereal, fruit, bird, wing, fish, arthropod, mammals, legendary creature, reptiles or amphibians. The geometric pattern may be a guilloche pattern. Furthermore, in a single reflective layer 23, a part may be opaque, and the remaining part may be translucent. According to these configurations, the visual effect of the verification 30 is enhanced and, in addition, the process of forming the reflective layer 23 is complicated and accordingly counterfeiting of the verification 30 is more difficult.

The following methods may be used for forming the reflective layer 23 in portions of the relief surface 21R. In a first method, a soluble resin is applied to portions of the relief surface 21R, and then a film is formed thereon using a material for forming a reflective layer 23, followed by washing away the soluble resin together with the film formed thereon. In a second method, a film is formed first across the relief surface 21R using a material for forming a reflective layer 23, followed by forming a mask on the film using an acid- or alkali-resistant resin. Then, the film is etched using the mask. In a third method, a film is formed first across the relief surface 21R using a material for forming a reflective layer 23, followed by forming a mask on the film using a photosensitive resin. Then, the film is etched using the mask. It should be noted that other methods may be used as long as a reflective layer 23 can be formed only in portions of the relief surface 21R.

[Printed Matter 32]

The printed matter 32 may have an arbitrary color. The printed matter 32 may be formed across the surface 31bF of the white layer 31b, or may be formed in portions of the surface 31bF. The printed matter 32 may be obtained by printing a geometric pattern, background, landscape, pattern, letter, numeral, character (glyph), seal (signature), symbol, emblem, coat of arms, code, or combinations thereof. The symbol or emblem may include a flag, shield, sword, spear, crown, star, moon, heart, logo, ribbon, line, flower, leaf, cereal, fruit, bird, wing, fish, arthropod, mammals, legendary creature, reptiles or amphibians. The code may be a one-dimensional code or two-dimensional code. The one-dimensional code may be a barcode, serial number or a combination thereof. The two-dimensional code may be a QR code. The geometric pattern may be a guilloche pattern.

An ink may be used as a material for forming the printed matter 32. An ink, such as an offset ink, letterpress ink or gravure ink, may be used depending on the printing method. An ink, such as a resin ink, oil-based ink or water-based ink, may be used depending on the composition. Furthermore, an ink, such as an oxidation polymerization ink, penetration drying ink, evaporative drying ink or ultraviolet curing ink, may be used depending on the drying method.

A functional ink may be used as the ink. The functional ink changes color according to the angle of applying light to the verification 30, or the angle of observing the verification 30. Such a functional ink may be an optically variable ink, color shift ink, pearl ink or the like.

The printed matter 32 may be formed by electrophotography using toner. In this case, toner in which color particles of graphite, a pigment or the like are adhered to plastic particles having electrostatic properties is prepared. Then, the toner is transferred to an object to be printed by using static electricity, followed by heating and fixing to form printed matter 32.

[Method of Producing Laminate]

Figure 7:
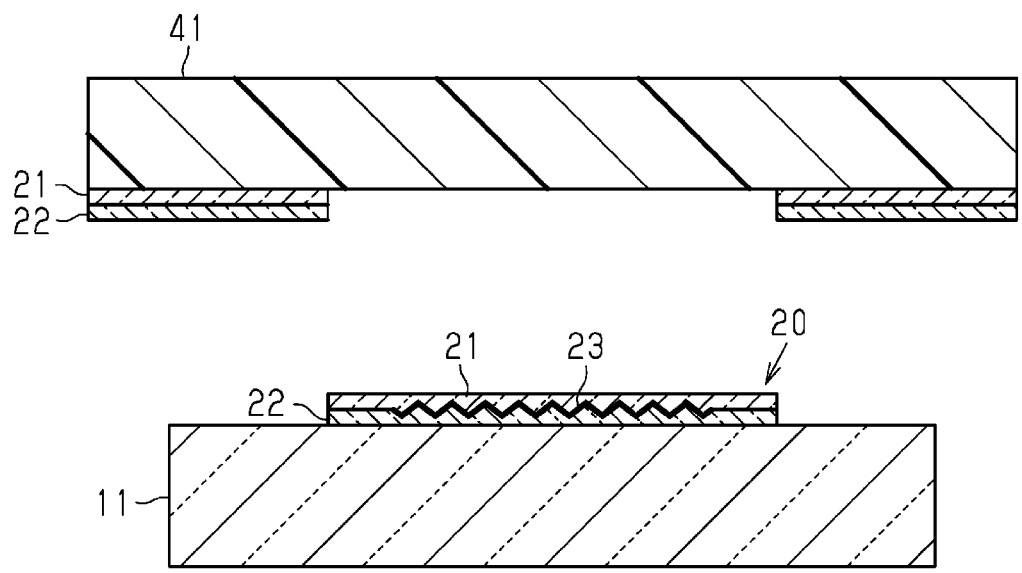
FIG. 7 is a diagram illustrating a process in a method of producing the laminate of FIG. 1.
Figure 8:
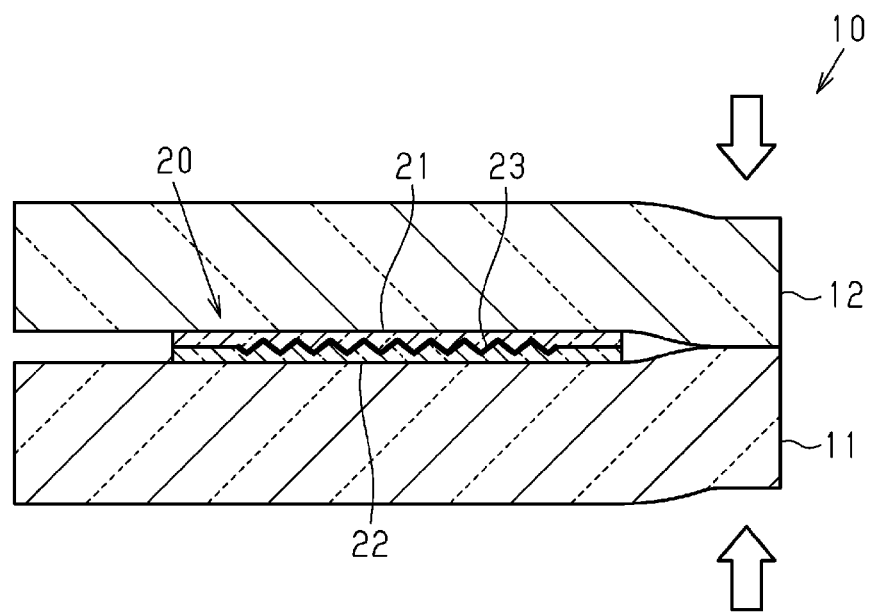
FIG. 8 is a diagram illustrating a process in the method of producing the laminate of FIG. 1.
Figure 9:
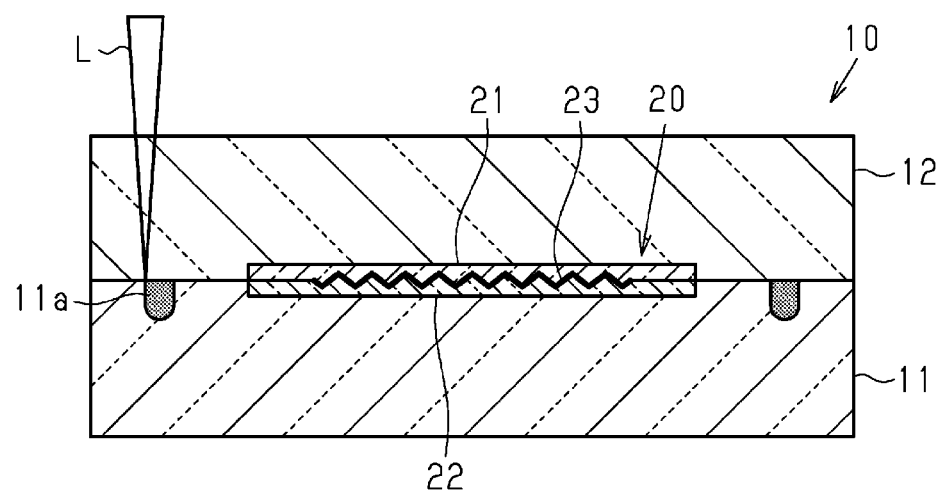
FIG. 9 is a diagram illustrating a process in the method of producing the laminate of FIG. 1.

The method of producing a laminate 10 includes preparing a recording layer 11 and a front covering layer 12. The production method includes laminating a security foil 20, which includes a relief layer 21 with a relief surface 21R and has a thickness of ⅕ or less the thickness of the recording layer 11, between the recording layer 11 and the front covering layer 12 so as to be located inside the outer edges of the recording layer 11 and the front covering layer 12. The production method includes applying heat and pressure to the recording layer 11, the front covering layer 12 and the security foil 20 in a state where the security foil 20 is disposed between the recording layer 11 and the front covering layer 12 to form a laminate sealing the security foil 20 with the recording layer 11 and the front covering layer 12. In the laminate 10 produced by such a production method, the adhesion strength between the security foil 20 and the recording layer 11 is higher than the adhesion strength between the security foil 20 and the front covering layer 12. Referring to FIGS. 7 to 9, a method of producing a laminate 10 will be described.

As shown in FIG. 7, when a laminate 10 is produced, a security foil 20 is firstly transferred to the surface of the recording layer 11. Specifically, heat and pressure are applied to a security foil 20 on a carrier 41 via the carrier 41 so that the protective layer 22 and the recording layer 11 adhere to each other. Then, the security foil 20 is separated from the carrier 41 as a result of a change in position of the carrier 41 relative to the security foil 20. It should be noted that the security foil 20 may be transferred to the front covering layer 12 without being limited to the recording layer 11.

The security foil 20 may be transferred using a metal or resin stamper. In this transfer step, the security foil 20 may be transferred under the conditions of a temperature set in the range of 80° C. or more and 150° C. or less, a contact time of the security foil 20 with an object to which it is transferred due to the stamper set in the range of 0.1 seconds or more and 3 seconds or less, and a transfer pressure set in the range of 100 kg/cm2 or more and 500 kg/cm2 or less. When the temperature, contact time, and transfer pressure are set to equal to or lower than the respective upper limits, portions around the security foil 20 are prevented from being transferred to the object to which the security foil 20 is transferred, or the surface of the object to which the security foil 20 is transferred is prevented from being deformed, which would otherwise have been caused due to excess heat. When the temperature, contact time, and transfer pressure are set to equal to or higher than the respective lower limits, the security foil 20 is prevented from being incompletely transferred to the object to which it is transferred, which would otherwise have occurred due to insufficient adhesion of the security foil 20 to the object to which it is transferred.

As shown in FIG. 8, the recording layer 11, to which the security foil 20 has been transferred, is covered with the front covering layer 12. Then, heat and pressure are applied to the security foil 20, the recording layer 11 and the front covering layer 12 to adhere the recording layer 11 and the front covering layer 12 together and seal the security foil 20 with the recording layer 11 and the front covering layer 12. In this adhesion step, an amount of heat can be applied to the recording layer 11 and the front covering layer 12 for softening and deformation thereof. Thus, reliability in adhesion is enhanced between the recording layer 11 and the front covering layer 12. When the recording layer 11 and the front covering layer 12 comprise polycarbonate, the temperature of the heat source applying heat to these layers may be set in the range of 170° C. or more and 200° C. or less, and the contact time of the heat source with the layers may be set in the range of 1 minute or more and 30 minutes or less. Thus, the recording layer 11 and the front covering layer 12 comprising polycarbonate can be more reliably adhered to each other.

If the security foil 20 has been transferred to the front covering layer 12 in the transfer step, the front covering layer 12, to which the security foil 20 has been transferred, may be covered with the recording layer 11 in the adhesion step.

As shown in FIG. 9, a portion of the recording layer 11 is irradiated with a laser beam L via the front covering layer 12. Through this irradiation step, an irradiated portion 11a is formed in the recording layer 11. Thus, a laminate 10 having an irradiated portion 11a can be obtained. The laminate 10 having an irradiated portion 11a may be used as a verification.

It should be noted that a film may be used as a carrier 41 supporting the security foil 20. The film that can be used may be a plastic film such as of polyethylene terephthalate (PET), polyethylene naphthalate (PEN) or polypropylene (PP). The film used as a carrier 41 may be a film that is less likely to be deformed or modified by the heat and pressure applied thereto when transferring the security foil 20. Paper, synthetic paper, plastic multilayer paper, resin-impregnated paper or the like may be used as the carrier 41. The carrier 41 may have a thickness of 4 μm or more. The thickness may be in the range of 12 μm or more and 50 μm or less. When the thickness of the carrier 41 is 4 μm or more, handleability of the carrier 41 is unlikely to be impaired due to the carrier 41 having insufficient physical strength.

The carrier 41 is not limited to have a single-layer structure but may have a multilayer structure. When the carrier 41 has a multilayer structure, the structure may include a core layer, e.g., the plastic film mentioned above, which imparts physical strength to the carrier 41, and an intermediate layer located between the core layer and the security foil 20. As such an intermediate layer, a layer for controlling the tendency of separation of the security foil 20 may be used.

When producing the verification 30 described above, the recording layer 11 is covered with the front covering layer 12 in the step described above referring to FIG. 7. Then, in a state where the recording layer 11, the white layer 31b and the rear covering layer 31a are laminated in this order, heat and pressure are applied to the security foil 20, the recording layer 11, the front covering layer 12, the white layer 31b and the rear covering layer 31a. Thus, a precursor of a verification 30 can be formed. By recording identification information and identifiable biometric information on the recording layer 11 of the precursor, a verification 30 can be obtained.

EXPERIMENTS

Experiments and comparative experiments relating to the verification will be described.

Experiment 1

To produce a verification, a security foil was formed on a carrier according to the following method. First, a resin A for a relief layer was applied by gravure printing onto one surface of a PET film (Lumirror 25T60 manufactured by Toray Industries, Inc.) (Lumirror is a registered trademark) having a thickness of 25 μm and serving as a carrier. In this case, the resin A was applied to the PET film such that the coating thickness would be 3 μm after removal of the solvent from the resin A by volatilization. Then, the coating film after removal of the solvent was roll-formed by pressing a cylindrical metal plate against the film. Thus, a relief layer having a relief surface was obtained. For the pressing, the pressure was set to 2 kgf/cm2, the temperature was set to 240° C., and the speed was set to 10 m/min.

Then, a reflective layer of zinc sulfide (ZnS) was formed with a thickness of 600 Å by vacuum deposition on the relief surface. Then, a resin B for a protective layer was applied to the reflective layer by gravure printing. In this case, the resin B was applied to the reflective layer such that the protective layer would have a coating thickness of 4 μm after removal of the solvent from the resin B by volatilization. Thus, a security foil formed on a carrier was obtained. The security foil had a thickness of 7.06 μm.

[Resin A for Relief Layer]

| Polymethylmethacrylate | 20 parts by mass |
| Polyester | 10 parts by mass |
| Methyl ethyl ketone | 80 parts by mass |

[Resin B for Protective Layer]

| Polyacrylate | 20 parts by mass |
| Polyester | 10 parts by mass |
| Methyl ethyl ketone | 50 parts by mass |
| Toluene | 50 parts by mass |

Next, the security foil was transferred to a recording layer (LEXAN SD8B94 manufactured by SABIC) having a thickness of 100 μm by using a hot stamp transfer machine. For the transfer, the temperature was set to 140° C., the pressure was set to 200 kg/cm2, and the time was set to 1 second.

There were prepared covering layers (LEXAN SD8B14 manufactured by SABIC) each having a thickness of 100 μm, and a white layer (LEXAN SD8B24 manufactured by SABIC) having a thickness of 400 μm, on which printed matter was formed. Then, the rear covering layer, the white layer, the recording layer and the front covering layer were laminated in this order in the thickness direction, such that the security foil was sealed between the recording layer and the front covering layer. Thereafter, heat and pressure were applied to the laminate of these layers using a heat source to adhere the rear covering layer, the white layer, the recording layer and the front covering layer to one another. For the adhesion, the temperature of the heat source was set to 190° C., the pressure was set to 80 N/cm2, and the contact time of the heat source with the laminate was set to 15 minutes.

Next, the obtained laminate was punched into a card shape. Then, some parts of the recording layer were irradiated with a laser beam using a laser printer to form irradiated portions. For the irradiation, a printer outputting a laser beam with a wavelength of 1,064 nm was used as the laser printer. By forming the irradiated portions, individual information was recorded on the recording layer, being associated with the owner of the verification. Thus, a verification was obtained.

Comparative Experiment 1

A verification of Comparative Experiment 1 was prepared as in Experiment 1 except that the resin for a relief layer was changed from resin A to resin C, and the resin for a protective layer was changed from resin B to resin D.

[Resin C for Relief Layer]

| | |
|---|---|
| Polyacrylate | 20 parts by mass |
| Polyester | 10 parts by mass |
| Methyl ethyl ketone | 0 parts by mass |
| Toluene | 50 parts by mass |

[Resin D for Protective Layer]

| | |
|---|---|
| Polymethylmethacrylate | 20 parts by mass |
| Polyester | 10 parts by mass |
| Methyl ethyl ketone | 80 parts by mass |

[Evaluation]

The adhesion strength between the security foil and the recording layer and between the security foil and the front covering layer was measured for the verifications of both Experiment 1 and Comparative Experiment 1. The adhesion strength was measured by the 90-degree peeling test method according to JIS K 6854-1 (ISO 8510-1). The measurements for Experiment 1 and Comparative Experiment 1 are shown in the following Table 1. As mentioned above, since the thickness of the security foil was 7.06 μm and the thickness of the recording layer was 100 μm, the thickness of the security foil was confirmed to be about 1/12.5 the thickness of the recording layer both in Experiment 1 and Comparative Experiment 1.

TABLE 1

| | | Adhesive strength (front covering layer) (N/15 mm width) | Adhesive strength (recording layer) (N/15 mm width) | Difficulty of reuse |
|---|---|---|---|---|
| Experiment 1 | Resin A | 5.1 | — | □ |
| | Resin B | — | 20 or more | |
| Comparative Experiment 1 | Resin C | 20 or more | — | x |
| | Resin D | — | 4.6 | |

As shown in Table 1, it was confirmed that, in the verification of Experiment 1, the adhesion strength between the security foil and the front covering layer was 5.1 N/15 mm width and that the security foil and the front covering layer could be separated at the interface therebetween. Also, the adhesion strength between the security foil and the recording layer was confirmed to be 20 N/15 mm width or more. Furthermore, it was confirmed that separation at the interface between the security foil and the recording layer was difficult and that, when the security foil was attempted to be separated from the recording layer, the security foil was broken near the interface between the security foil and the recording layer, further breaking the relief layer. Therefore, reuse of the security foil of the verification of Experiment 1 was confirmed to be difficult.

In the verification of Comparative Experiment 1, it was confirmed that the adhesion strength between the security foil and the front covering layer was 20 N/15 mm width or more. Furthermore, it was confirmed that, when an attempt was made to separate the security foil from the front covering layer, the security foil was broken near the interface between the security foil and the front covering layer, further breaking the relief layer. Also, it was confirmed that the adhesion strength between the security foil and the recording layer was 4.6 N/15 mm width and that the security foil and the recording layer could be separated at the interface therebetween. Specifically, it was confirmed that, in Comparative Experiment 1, since the security foil could be separated from the recording layer together with the front covering layer not containing individual information, the security foil could be reused together with the front covering layer and combined with a counterfeited recording layer to thereby produce a fake verification. In other words, the security foil of the verification of Comparative Experiment 1 was confirmed to be easily reused.

As described above, according to an embodiment of the laminate, the verification and the method of producing the laminate, the advantageous effects set forth below can be obtained.

(1) Since the thickness of the security foil 20 is ⅕ or less the thickness of the recording layer 11, it is difficult to separate the security foil 20 from the recording layer 11 without breaking the security foil 20, compared, for example, to the configuration where the thickness of the security foil 20 is approximately equal to that of the recording layer 11. Therefore, production of a fake laminate by reusing the security foil 20 of the laminate 10 is difficult.

(2) The information recorded on the irradiated portion 11*a* can be prevented from being falsified by covering the irradiated portion 11*a* with the security foil 20.

(3) Since the recording layer 11 comprises polycarbonate, and the protective layer 22 comprises a carbonate bond, a urethane bond or an ester bond, the adhesion strength between the recording layer 11 and the protective layer 22 can be easily enhanced.

(4) The recording layer 11 and the front covering layer 12 may comprise polycarbonate, the protective layer 22 may comprise a resin having a melting point lower than polycarbonate, and the relief layer 21 may comprise a resin having a melting point higher than polycarbonate. Thus, the adhesion strength between the protective layer 22 and the recording layer 11 can be enhanced, and the adhesion strength between the relief layer 21 and the front covering layer 12 can be reduced.

(5) Since the relief layer 21 comprises at least one material from the first material group and the protective layer 22 comprises at least one material from the second material group, a configuration in which the adhesion strength between the security foil 20 and the recording layer 11 is higher than the adhesion strength between the security foil 20 and the front covering layer 12 can be easily achieved.

(6) Since the relief structure has specific optical properties for incident light, counterfeiting of the security foil 20 is difficult. Thus, counterfeiting of the laminate 10 including the security foil 20 is also difficult, resultantly preventing counterfeiting of the laminate 10.

(7) The front covering layer 12 may transmit part or all of the wavelength range of infrared light, and the security foil 20 may also transmit part or all of the wavelength range of infrared light. Thus, an irradiated portion 11*a* can be formed on the recording layer 11 via the front covering layer 12 and the security foil 20. Specifically, an irradiated portion 11*a* can be formed in a region covered with the security foil 20 as viewed in the thickness direction of the recording layer 11.

The embodiment described above can be appropriately modified and implemented as follows.

The reflective layer 23 may have a refractive index of less than 2.0 in visible light. With this configuration, as long as the refractive index of the reflective layer 23 is higher than that of the relief layer 21, the advantageous effects of the reflective layer 23 described above can be obtained to some extent due to the laminate 10 being provided with the reflective layer 23.

The scope of the present disclosure should not be limited to the embodiments illustrated and described so far, but can also encompass all the embodiments bringing about advantages that are equivalent to those aimed by the present invention. Furthermore, the scope of the present disclosure should not be limited to the features of the invention defined by the claims, but should also include all the disclosed features and all the combinations of the features.

The terms "part", "element", "pixel", "cell", "segment", "unit", "display" or "article" used in the present disclosure represent physical entities. The physical entity may refer to a physical form or a spatial form surrounded by substances. The physical entity may be a structure. The structure may have specific functions. A combination of structures having the specific functions can exhibit a synergistic effect by combination of the functions of the structures.

The terms used in the present disclosure, particularly in the appended claims (e.g., the text of the claims), are generally intended to be "open" terms (e.g., the terms "include" and "have" should be interpreted as "have at least", or the term "include" should be interpreted as "include, but not limited to").

Furthermore, the drawings should be referred to as necessary when interpreting terms, configurations, features, aspects and embodiments. Aspects that can be directly and unambiguously derived from the drawings should provide the basis of correction as the text of specification does.

If a specific claim description is intended, but if such an intention is not explicitly described in the claim, or if there is no such a description, such an intention should not be taken to exist. For example, for the sake of clarity, the appended claims can use introductory phrases, such as "at least one" or "one or more", in the claim recitation. However, use of such phrases should not be construed such that recitation in a claim with an indefinite article "a" or "an" causes a specific claim including such a claim description to be limited to an embodiment including such an expression in the singular. The introductory phrase "one or more" or "at least one", and an indefinite article "a" or "an" (e.g., "a" and/or "an") should at least be construed to refer to "at least" ("one" or "one or more"). The same applies to definite expressions used for introducing claim descriptions.

REFERENCE SIGNS LIST

10 . . . Laminate; 10F, 21F, 30F, 31bF (Front) surface; 11 . . . Recording layer; 11a . . . Irradiated portion; 11b . . . Non-irradiated portion; 12 . . . Front covering layer; 20 . . . Security foil; 21 . . . Relief layer; 21R . . . Relief surface; 22 . . . Protective layer; 22R . . . Rear surface; 23 . . . Reflective layer; 30 . . . Verification; 31 . . . Support layer; 31a . . . Rear covering layer; 31b . . . White layer; 32 . . . Printed matter; 41 . . . Carrier; L . . . Laser beam; PIC1 . . . First image; PIC2 . . . Second image; PIC3 . . . Third image; PIC4 . . . Fourth image; PIC5 . . . Fifth image; PIC5a . . . Type of identification information; PIC5b . . . Identification information.

What is claimed is:

1. A laminate, comprising:
a recording layer;
a translucent front covering layer; and,
a security foil having a thickness of $\frac{1}{5}$ or less of a thickness of the recording layer, wherein the security foil is laminated between the recording layer and the front covering layer, for sealing in the laminate, wherein
the security foil includes a relief layer having a relief surface and a protective layer covering the relief surface, the protective layer adhering to the recording layer and the relief layer adhering to the front covering layer in a thickness direction of the laminate; and,
an adhesion strength between the security foil and the recording layer is higher than an adhesion strength between the security foil and the front covering layer, and wherein
the recording layer and the front covering layer comprise polycarbonate;
the protective layer comprises a first resin having a melting point lower than a melting point of the polycarbonate; and,
the relief layer comprises a second resin having a melting point higher than the melting point of the polycarbonate.

2. The laminate of claim 1, wherein the recording layer includes an irradiated portion in a region covered by the security foil as viewed in the thickness direction of the laminate.

3. The laminate of claim 1, wherein the relief surface has at least one of properties of diffracting light that is incident on the relief surface, preventing or reducing reflection of light that is incident on the relief surface, isotropically reflecting light that is incident on the relief surface, anisotropically reflecting light that is incident on the relief surface, collecting light that is incident on the relief surface, and reflecting specific polarized light included in light that is incident on the relief surface.

4. The laminate of claim 1, wherein
the front covering layer transmits part or all of the wavelength range of infrared light; and,
the security foil transmits part or all of the wavelength range of infrared light.

5. A verification comprising a laminate of claim 1, and a support layer that reinforces the laminate.

6. A method of producing a laminate, comprising:
preparing a recording layer and a front covering layer;
sealing a security foil between the recording layer and the front covering layer so as to be located inside outer edges of the recording layer and the front covering layer, the security foil having a thickness of $\frac{1}{5}$ or less of a thickness of the recording layer, the security foil including a relief layer having a relief surface and a protective layer covering the relief surface; and,
applying heat and pressure to the recording layer, the front covering layer and the security foil in a state where the security foil is disposed between the recording layer and the front covering layer to form a laminate sealing the security foil with the recording layer and the front covering layer, wherein
an adhesion strength between the security foil and the recording layer is higher than an adhesion strength between the security foil and the front covering layer, wherein
the recording layer and the front covering layer comprise polycarbonate;

the protective layer comprises a first resin having a melting point lower than a melting point of the polycarbonate; and, the relief layer comprises a second resin having a melting point higher than the melting point of the polycarbonate.

* * * * *